United States Patent [19]

Endo

[11] 4,271,383
[45] Jun. 2, 1981

[54] DC MOTOR CONTROL CIRCUIT

[75] Inventor: Takeshi Endo, Shiojiri, Japan

[73] Assignee: Shinshu Seiki Kabushiki Kaisha, Tokyo, Japan

[21] Appl. No.: 821,874

[22] Filed: Aug. 4, 1977

[30] Foreign Application Priority Data

Aug. 6, 1976 [JP] Japan .............................. 51-105134

[51] Int. Cl.³ .............................................. H02P 3/12
[52] U.S. Cl. .................................. 318/375; 318/380
[58] Field of Search .............. 318/446, 459, 342, 379, 318/380; 308/375

[56] References Cited

U.S. PATENT DOCUMENTS

| 3,188,547 | 6/1965 | Zelina | 318/380 |
| 3,440,511 | 4/1969 | Igarashi et al. | 318/380 |
| 3,566,229 | 2/1971 | Wickens | 318/380 |
| 3,919,611 | 11/1975 | Takahashi et al. | 318/380 |

Primary Examiner—David Smith, Jr.
Assistant Examiner—M. K. Mutter
Attorney, Agent, or Firm—Blum, Kaplan, Friedman, Silberman & Beran

[57] ABSTRACT

A DC motor control circuit for providing improved starting and stopping control is provided. The control circuit includes a DC motor that is driven in response to an operating voltage applied thereto. A shunting element is adapted to define a current path in parallel with the DC motor to selectively shunt the operating voltage applied to the DC motor. A DC supply is provided for producing a DC signal, and a constant voltage supply circuit is coupled intermediate the DC supply and the parallel connection of the shunt element and DC motor to selectively apply a constant operating voltage to the DC motor. A control circuit is provided for coincidentally applying a control signal to the constant voltage circuit and to the shunt element to effect a coincident shunting of the operating voltage applied to the DC motor and a cutting-off of the application of the operating voltage to the DC motor.

12 Claims, 7 Drawing Figures 4,271,383

DC MOTOR CONTROL CIRCUIT

BACKGROUND OF THE INVENTION

This invention is directed to a DC motor control circuit, and, in particular, to a control circuit for effecting improved starting and stopping of a DC motor.

Heretofore the use of DC motors and control circuitry for driving the DC motors at constant speeds have been developed. However, the starting and stopping of such constant rotation DC motors has been found to be less than completely satisfactory. For example, when a DC motor is started, in response to a low magnitude voltage, it is difficult to obtain a constant rotational speed immediately after starting. Similarly, when a DC motor is stopped, it is difficult to assure that no rotations are effected immediately after stopping. One type of low magnitude voltage device, wherein a faint voltage signal is utilized to control a DC motor, is a printer. Additionally, scenery cameras, miniaturized information processing instrumentation, such as calculators and other automatic control instruments, all require a low energy, high performance, stable operating constant rotational speed DC motor that has a particularly sensitive start/stop control. Although braking devices can be utilized with the DC motor, such braking devices require additional power consumption to energize the transistorized circuit in order to overcome the braking means when immediate starting is required. Accordingly, a control circuit for effecting improved starting and stopping of a DC motor is desired.

SUMMARY OF THE INVENTION

Generally speaking, in accordance with the invention, a DC motor control circuit for providing improved starting and stopping control, is provided. A DC motor is adapted to be driven in response to an operating voltage applied thereto. A shunt element is coupled in parallel with the DC motor for selectively shunting the operating voltage applied to the DC motor. The invention is particularly characterized by a DC supply for producing a DC signal and a constant voltage circuit, coupled intermediate the DC supply and the parallel connection of the shunt element and DC motor, for selectively applying a constant operating voltage to the DC motor in response to the DC signal being applied thereto. The constant voltage circuit is adapted to cut-off the application of a constant operating voltage to the DC motor in response to a control signal applied thereto. A control circuit is provided for coincidentally applying a control signal to the constant voltage circuit and to the shunt element to selectively shunt the operating voltage applied to the DC motor and cut-off the application of the operating voltage to the DC motor.

Accordingly, it is an object of this invention to provide a DC motor control circuit wherein improved starting and stopping is provided.

Another object of this invention is to provide a simplified, inexpensive, highly reliable and stable operating DC control circuit wherein improved starting and stopping is effected.

Still a further object of the instant invention is to provide a DC motor control circuit that permits improved repetitive high speed starting and stopping of a DC motor.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
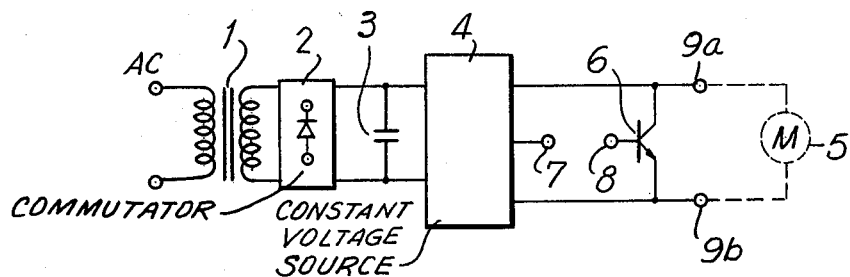
FIG. 1 is a block circuit diagram of a DC motor control circuit constructed in accordance with the instant invention.

Reference is now made to FIG. 1, wherein a block circuit diagram of a DC motor control circuit, adapted to provide improved starting and stopping control to a DC motor 5, is depicted. A power transformer, generally indicated as 1, is utilized to couple a commutator, generally indicated as 2, to an AC supply. The commutator 2 converts the AC signal into a DC voltage, which voltage is applied across a smoothing capacitor 3 to a constant voltage circuit 4. The constant voltage circuit 4 is adapted to selectively apply a fixed operating voltage across the terminals 9a and 9b of the DC motor 5, in order to effect a driving of the DC motor 5. The DC motor has a mechanical governor in order to provide a constant rotational speed to the motor during and after starting.

In order to effect braking of the motor, a shunting transistor, generally indicated as 6, has its collector and emittor electrodes coupled in parallel with the DC motor 5 in order to define a backing circuit therefor. The base electrode of the shunt transistor 6 defines a shunt terminal. The shunt terminal is adapted to be referenced from a low voltage level to a high voltage level to turn the transistor 6 ON and thereby define a closed current path across the DC motor 5. The closed current path shunts all the current applied to the DC motor therethrough and, hence, cuts-off the voltage supplied to the DC motor. When the transistor 6 is turned OFF, the fixed operating voltage produced by the constant voltage circuit is applied to the DC motor to effect driving of same. The constant voltage circuit includes an input terminal 7, which terminal is adapted to selectively cut-off the application of an operating voltage by the constant voltage circuit 4 to the DC motor in response to a control signal being applied thereto.

Accordingly, the operation of a DC control circuit, of the type to which the instant invention is directed, is characterized by the application of a START-STOP control signal to the input terminal 7 of the constant voltage circuit and the control electrode 8 of the shunting transistor 6, in order to control the starting and stopping of the DC motor 5. Specifically, when an START signal is applied to the input terminal 7 of the constant voltage circuit, a constant operating voltage is applied across the DC motor 5, to thereby effect a driving of same. At the same time, the START signal is also applied to the shunt terminal 8 of the shunting transistor 6 to thereby turn same OFF and insure that the current, resulting from the constant operating voltage produced by the constant voltage circuit, is applied to the DC motor to effect a driving of same. When it is desired to immediately stop the DC motor, a STOP signal is applied to the control electrode 8 of the shunt transistor to thereby turn same ON and, hence, define a short circuit through the current-to-emitter path of the shunting transistor, and thereby prevent any current and, hence, voltage from being generated across the DC motor 5. At the same time that the START signal is applied to the shunt terminal 8 of the shunting transistor 6, it is also applied to the input terminal 7 of the constant voltage circuit to thereby cut-off the application of a constant operating voltage, and, hence, prevent the constant operating voltage from being applied to the DC motor. Accordingly, when the STOP signal is applied to the shunt terminal 8 and input terminal 7, the DC motor immediately expends any stored up energy and is stopped by the absence of any current and voltage (power) being applied thereto. Thus, as detailed in the exemplary embodiments discussed at length below, the instant invention is particularly characterized by the shunting of the current applied to the DC motor coincident with the cutting-off of the constant operating voltage applied to the DC motor to insure that the starting of the DC motor is as efficiently attained as the stopping of the DC motor.

Figure 2:
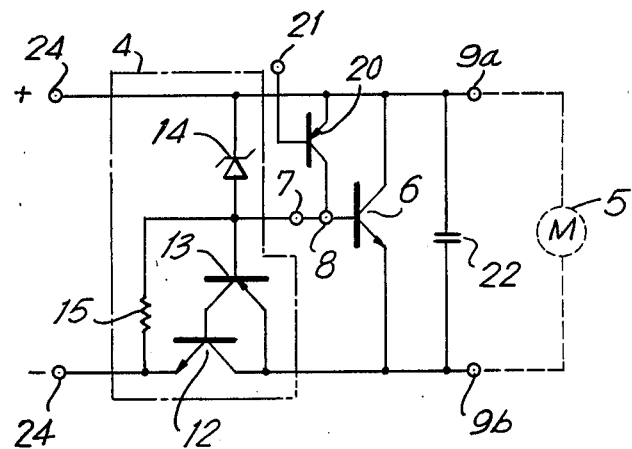
FIG. 2 is a detailed circuit diagram of a DC motor control circuit constructed in accordance with a first embodiment of the instant invention.

Reference is now made to FIG. 2, wherein a detailed circuit diagram of a DC motor control circuit, constructed in accordance with a first embodiment of the instant invention, is depicted, like reference numerals being utilized to denote like elements depicted above. The smoothing capacitor 3, commutator 2 and transformer 1, detailed above, have been omitted from the DC motor control circuit depicted in FIG. 2, and (+) and (−) DC supply terminals 24 representative of the DC voltage signal applied by these elements substituted therefor. Moreover, the DC motor control circuit, illustrated in FIG. 2, includes a shunt transistor 6, having a shunt terminal 8, a collector-emitter electrode path disposed in parallel with a capacitor 22 and a DC motor 5, in order to effect shunting of the DC motor 5 in the same manner detailed above with respect to FIG. 1.

The constant voltage circuit, generally indicated as 4, is disposed intermediate the DC supply terminals 24 and the shunting transistor 6 and is adapted to selectively apply a constant operating voltage to the DC motor 5. The constant voltage circuit 4 includes a Zener diode 14, a resistor 15, a first drive control transistor 13 and a power stage transistor 12. First drive control transistor 13 and power stage transistor 12 define a speed control circuit in series with the parallel connection of the DC motor and shunt transistor and are coupled in a well known manner to define a Darlington connection. The collector and emitter electrodes of power transistor 12 define a current path in series-connection with a terminal of the DC voltage source and the DC motor 5. As will be discussed in greater detail below, the base electrode of the first transistor 13 is utilized as an ON-OFF control electrode for the constant voltage circuit. To this end, a resistor 15 is provided for supplying a current to the base electrode of the first transistor 13 and the Zener diode 14 is utilized to reference the base electrode of the first transistor 13 to a predetermined voltage. Coupled to the input terminal 7 of the constant voltage circuit, defined by a node between the Zener diode 14, resistor 15 and first transistor 13, is a control transistor 20 having a control input 21. Also coupled to the collector electrode of control transistor 20 is the shunt terminal 8 (base electrode) of the shunt transistor 6.

Accordingly, when the DC motor is OFF, and a DC signal is applied to supply terminals 24, a starting of the motor is effected by the application of a HIGH level START signal to the control electrode 21 of the control transistor 20. When a START signal is applied to the control electrode 21, the transistor 20 is turned OFF, thereby defining an open or infinite impedance circuit between the emitter-collector electrodes. This, in turn, maintains the shunt transistor 6 in an OFF condition, to thereby define an open or infinite impedance circuit between the collector and emitter electrodes of the shunt transistor 6. Accordingly, the DC signal, applied to supply terminal 24, is applied across the Zener diode 14, first transistor 13, power stage transistor 12 and resistor 15 to thereby reference the input terminal 7 of the constant voltage circuit to a lower voltage and thereby turn ON the first drive control transistor 13 and power stage transistor 12 and hence effect an application of the constant operating voltage to the DC motor 5. In response to a START signal, applied to the control electrode 21 of the control transistor 20, the DC motor 5 is immediately driven at a constant speed. However, when a STOP signal is applied to the control electrode 21 of the transistor 20, the control transistor 20 is turned ON, thereby referencing the shunt terminal (base electrode) of the shunt transistor 6 and the input terminal 7 of the constant voltage circuit to a higher voltage level. By referencing the input terminal 7 of the constant voltage circuit to a higher voltage level, the base electrode of the first drive control transistor 13 is referenced to a higher voltage thereby turning OFF transistors 12 and 13. By turning OFF transistors 12 and 13, the constant voltage circuit cuts-off the application of a constant operating voltage to the DC motor. Simultaneously therewith, the elevation of the voltage level of the shunt terminal results in the shunt transistor 6 being turned ON, to thereby define a closed collector-emitter current path, of the type detailed above and prevent any current from being applied to the DC motor. Accordingly, in response to a STOP signal being applied to the control electrode 21, the DC motor is immediately stopped. It should be noted that in the arrangement, depicted in FIG. 2, the shunt transistor is always turned OFF to define an open collector-emitter path when the constant voltage circuit is producing a constant operating voltage for driving the DC motor, in view of the biasing voltage generated by the Zener diode 14.

Figure 3:
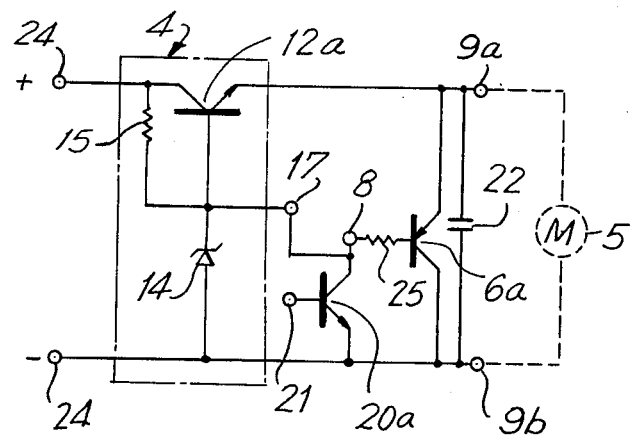
FIG. 3 is a detailed circuit diagram of a DC motor control circuit constructed in accordance with a second embodiment of the instant invention.

Reference is now made to FIG. 3, wherein a DC motor control circuit, constructed in accordance with a further embodiment of the instant invention, is depicted, like reference numerals being utilized to denote like elements depicted above. The DC motor control circuit, depicted in FIG. 3, utilizes opposite polarity transistors to those utilized in the DC motor control circuit, depicted in FIG. 2. Accordingly, each of the opposite polarity transistors utilized in the DC motor control circuit, depicted in FIG. 3, that perform the same function as a transistor in the DC motor control circuit, depicted in FIG. 2, has been identified by the same reference numeral followed by an "a". It is noted, however, that a resistor 25 is coupled intermediate the base electrode of the shunt transistor 6a and the shunt terminal 7 thereof in order to limit the base current applied thereto. By increasing the resistance of the resistor 25, the suddenness with which the DC motor is stopped can be lessened.

Figure 4:
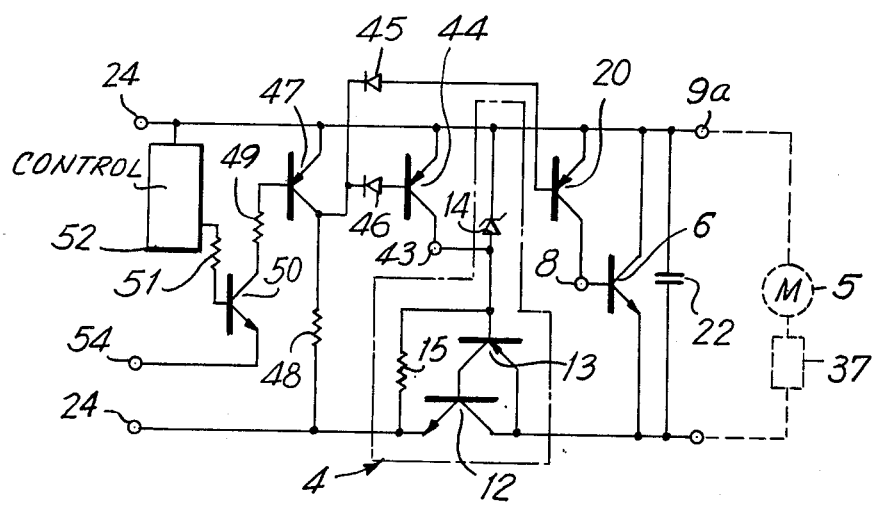
FIG. 4 is a detailed circuit diagram of a DC motor control circuit constructed in accordance with a third embodiment of the instant invention.

Reference is now made to FIG. 4, wherein a further embodiment of a DC control circuit is depicted, like reference numerals being utilized to denote like elements described above. The DC motor control circuit, depicted in FIG. 4, is characterized by the input terminal 43 of the constant voltage circuit 4 not being directly coupled to the input terminal 8 of the shunt transistor 40. Instead, the input terminal 8 of the shunt transistor 40 and the input terminal 43 of the constant voltage circuit 4 are respectively connected, in parallel, with START-STOP control transistors 20 and 44, respectively.

Specifically, first START-STOP control transistor 20 operates in the same manner detailed above with respect to the embodiment depicted in FIG. 2. However, the second START-STOP control transistor 44 is coupled to the input terminal 43 of the constant voltage circuit 4 in order to control the drive control transistor 13, power stage transistor 12 and resistor 15 in the same manner detailed above. First control transistor 20 and second control transistor 24 are respectively coupled through diodes 45 and 46 to the collector electrode of transistor 47. Transistor 47 effects a coupling of the first and second control transistors through transistor 47 and a further transistor 50 to the input of a logic control circuit 52. It is noted that transistor 47 is coupled through a resistor 49 to the collector of transistor 50 and that the base electrode of transistor 50 is coupled through a further resistor 51 to the output of the logic control circuit 52. Also, the collector electrode of the transistor 47 is coupled through a resistor 48 to a negative, or reference, supply terminal 24.

When the DC motor is being driven by a constant operating voltage supplied by the constant voltage circuit, the operation of the DC motor control circuit, depicted in FIG. 4, is substantially identical with the operation described above with respect to FIGS. 2 and 3. However, when it is desired to brake the operation of the DC motor, the control logic circuit 52 produces a LOW level STOP signal, which signal is applied to the base electrode of transistor 50 and, hence, to the base electrode of transistor 47 to thereby turn both transistors OFF. In response to transistor 47 being turned OFF, the diodes 45 and 46, coupled to the collector electrode thereof, are referenced to a lower voltage level and thereby cause the first control transistor 20 and second control transistor 44 to be turned ON. Once control transistor 44 is turned ON, the constant voltage circuit 4 is cut-off in the same manner detailed above and, similarly, once the control transistor 20 is turned ON and thereby references the shunt terminal 8 of the shunt transistor 6 to a higher voltage level, a shunting of the current applied across the DC motor is effected. It is noted that a noise filter 37 can be disposed in series with the DC motor 5 in order to substantially reduce the noise levels of the DC motor during operation. Accordingly, the DC motor control circuit, depicted in FIG. 4, is characterized by the simultaneous shunting of the current to the DC motor and cutting-off of the constant operating voltage supplied to the DC motor in order to effect an immediate stopping of same in accordance with the teachings of the instant invention.

Figure 5:
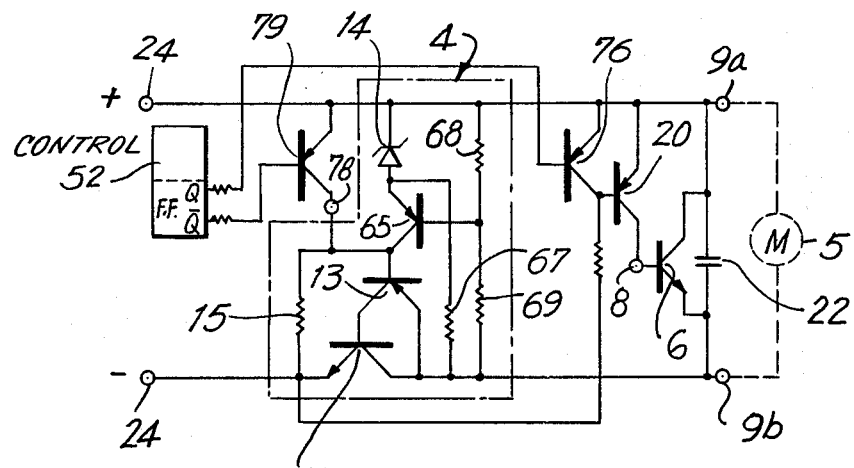
FIG. 5 is a detailed circuit diagram of a DC motor control circuit constructed in accordance with a fourth embodiment of the instant invention.

Referring now to FIG. 5, a DC motor control circuit, constructed in accordance with still a further embodiment of the instant invention, is depicted, like reference numerals being utilized to denote like elements described above. The DC motor control circuit, depicted in FIG. 5, is similar to the DC motor control circuit depicted in FIG. 4, with the exception that the constant voltage circuit, generally indicated as 61, is a feedback circuit. It is noted that the first drive control transistor 13 and power stage transistor 12, defining a Darlington connection, the supply resistor 15 and the Zener diode 14 of the constant voltage circuit operate in the same manner detailed above. However, a flip-flop 52 has its Q output coupled to the base electrode of a first transistor 76. First transistor 76 has its collector electrode coupled to the control electrode of the first control transistor 20 and, additionally, is coupled through a resistor to the node between the power stage transistor 12 and supply resistor 15. The $\overline{Q}$ output of flip-flop 52 is coupled to the base electrode of a second transistor 79. The collector electrode of the second transistor 79 is coupled to the input terminal 78 of the constant voltage circuit 61. The input terminal 78, of the constant voltage circuit, in addition to being coupled to the base electrode of the drive control transistor 13 of the Darlington connection is also coupled to the collector electrode of a detection transistor 65. Detection transistor 65 has its base electrode respectively coupled through resistor 68 and resistor 69 to the positive and negative terminals 24 of the DC supply. The emitter electrode of the detection transistor 65 is coupled to the Zener diode 14 and, additionally, through a resistor 67 to the negative DC supply terminal 24. Accordingly, as in the embodiments detailed above, when the output Q of the flip-flop 52 is a LOW binary signal, the motor is operating and the first transistor 76 applies, to the control input 21 of the control transistor 20, a LOW binary signal to thereby turn OFF shunt transistor 6. Similarly, when the output Q of the flip-flop 52 is a LOW level signal, the output $\overline{Q}$ applied to second transistor 79 is a HIGH level output, which output turns OFF second transistor 79 and assures that the Darlington connection is referenced to a voltage level determined by the Zener diode 14. However, when it is desired to stop the DC motor, a STOP signal, in the form of a HIGH Q output from flip-flop 52 and a LOW $\overline{Q}$ output from flip-flop 52, will produce the appropriate STOP signals. Specifically, the LOW output signal Q, from the flip-flop 52, is applied to first transistor 76, to thereby apply a HIGH level signal to the control electrode 21 of the control transistor 20 to thereby elevate the voltage level of the base electrode of the shunt transistor 6 and effect a shunting of the current applied to the DC motor to thereby cut-off the current applied thereto. Similarly, the HIGH $\overline{Q}$ output of the flip-flop 52 turns ON second transistor 79 to thereby elevate the voltage to which the transistors of the Darlington connection are referenced and thereby cut-off the constant operating voltage supplied to the DC motor. Accordingly, the DC motor control circuit is capable of starting and stopping a DC motor in accordance with the teachings of the instant invention.

Figure 6:
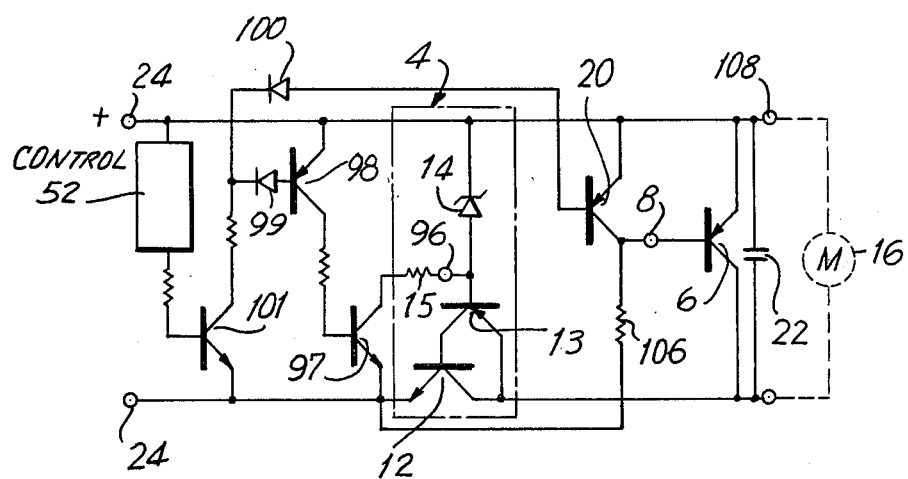
FIG. 6 is a detailed circuit diagram of a DC motor control circuit constructed in accordance with a fifth embodiment of the instant invention.

Turning now to FIG. 6, still a further DC motor control circuit, constructed in accordance with the instant invention, is illustrated, like reference numerals being utilized to denote like elements described above. The constant voltage circuit, generally indicated as 4, includes Zener diode 14, supply resistor 15 and a Darlington connection comprised of drive control transistor 13 and power stage transistor 12, which circuit elements operate in the same manner detailed above. However, a second control transistor 97 is disposed intermediate the supply resistor 15 and the power stage transistor 12 to effect a further control of the constant voltage circuit 4. Moreover, the shunt terminal 8, of the shunt transistor 6, is coupled through a resistor 106 to the emitter electrode of the second control transistor 97 in order to effect control of the shunt terminal of the shunt transistor thereby. Accordingly, unlike the embodiments detailed above, the shunt transistor 6 is rendered conductive by a current supplied through resistor 106 instead of by the induced voltages of the DC motor. Logic control circuit 52 is coupled to a first transistor 101, which transistor is coupled through a diode 100 to the base electrode of first control transistor 20 and through a diode 99 and second transistor 98 to second control transistor 97. When first transistor 101 is turned ON by the logic circuit 52, second transistor 98 and first control transistor 20 are turned ON and, hence, couple the respective base electrodes of shunt transistor 6 and control transistor 97 to the positive terminal of the DC supply 24. In response to being referenced to a higher voltage level, the shunt transistor 6 and first control transistor 97 are turned ON to thereby effect a stopping of the DC motor.

It is noted that the second control transistor 97 is coupled in series with the supply resistor 15 and permits a current to be supplied thereto. Accordingly, the fixed voltage, determined by the Zener diode 14, is applied to the DC motor through the Darlington connection. However, when the control transistor 20 is turned ON, shunt transistor 6 is turned OFF. When first transistor 101 is turned OFF by the logic control circuit 52, second transistor 98 and control transistor 20 are turned OFF, thereby cutting off the constant voltage circuit. This, in turn, causes a base current to flow from the DC supply through resistor 106 to the shunt terminal of the shunt transistor 6 to effect a sudden stopping of the DC motor 5. Similarly, the input terminal 7 of the constant voltage circuit, in response to the turning ON of the control transistor 97, couples the base electrode of first transistor 50 in the Darlington connection, and hence cuts-off the application of the constant operating voltage to the DC motor 5. Thus, at the same time that the constant voltage circuit cuts-off the supply of a constant operating voltage to the DC motor, the shunt transistor 6 effects a shunting of the DC motor in accordance with the teachings of the instant invention.

Figure 7:
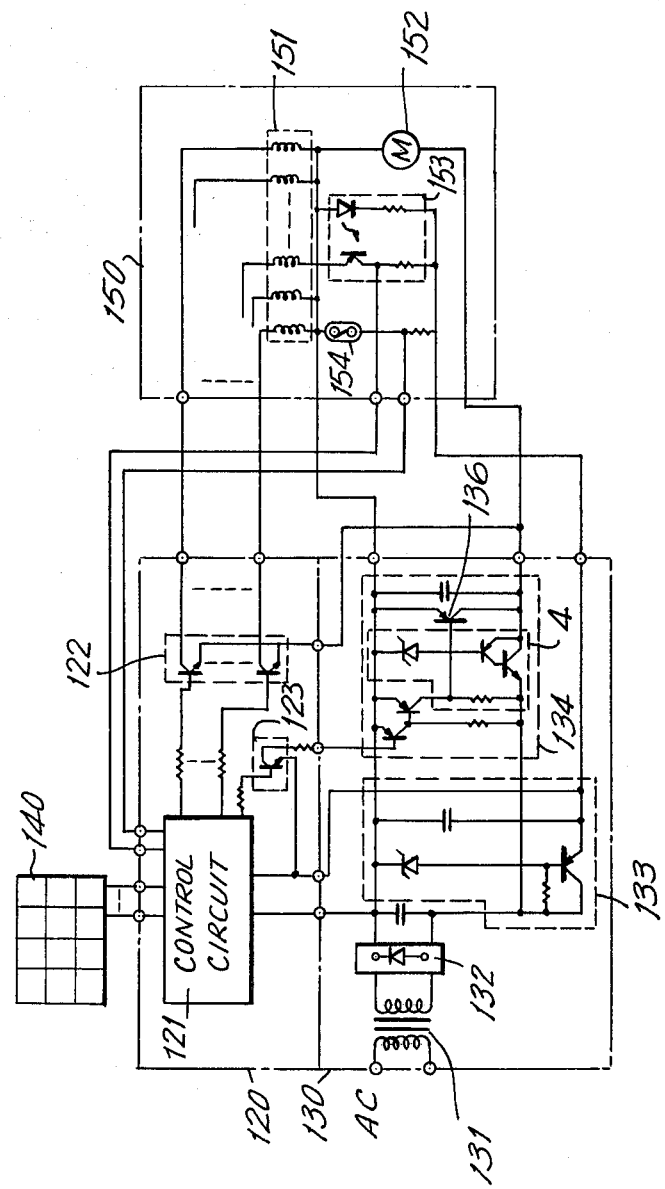
FIG. 7 is a circuit diagram of a calculator including a DC motor control circuit constructed in accordance with the instant invention.

Reference is now made to FIG. 7, wherein an electronic calculator, including a printer assembly and further including a DC motor control circuit, constructed in accordance with the instant invention, for controlling the operation of the printer, is depicted, like reference numerals being utilized to denote like elements described above. A logic circuit, generally indicated as 120, comprised of an LSI control circuit chip 121 and an output circuit 122, is provided. Each output of the control circuit 121 is coupled through an output transistor in the output circuit 122 to an electromagnet 151 for effecting a trigger function, a ribbon shift function, a paper feeding function, a stamping function, or the like, in a printer, generally indicated as 150. A second output circuit 123, of the output and control circuit 121, is utilized to effect a START-STOP control of the DC motor 152. The entire DC motor control circuit, generally indicated as 130, includes an AC transformer 131, commutator 132, constant voltage circuit 133, which circuits are substantially identical to those described in detail above. The printer includes a position detector 154 and timing signal detector 153. The shunt transistor 6 is coupled with its collector-emitter path in parallel with the DC motor 152 in order to shunt the current therefrom and, hence, stop same from rotating. A control circuit, generally indicated as 134, is provided for controlling the rotation of the DC motor 152. Finally, a keyboard 140 is provided for controlling the entire operation of the calculator in a conventional manner.

The constant voltage circuit 133 continuously applies a constant operating voltage to the logic circuit 120, to the timing signal detector 153 of the printer and to the position detector 154, when a DC signal is being supplied thereto by virtue of the calculator being turned ON. When a key on keyboard 140 is actuated, the constant voltage circuit 4 is turned ON and, hence, is rendered conductive by the output circuit 123 of the output and control circuit 121 to thereby apply a constant voltage to the DC motor 152 and, hence, effect a starting of same. The character position of the printer 150 is selected by a signal, produced by the timing signal detector 153, and in response thereto, the appropriate electromagnets 151 are triggered to thereby effect printing. The output circuit 123 of the output and control circuit 121 is cut-off by a signal produced by the position detector 154 to thereby cut-off the constant operating voltage supplied by the constant voltage circuit 135, and, at the same time, the shunting transistor 136 is rendered conductive, to thereby instantly stop the DC motor 152. Accordingly, when the character position of the printer is selected by the timing signal detector, stopping of the DC motor is effected to thereby permit printing to be effected.

Accordingly, the instant invention is particularly characterized by the use of a constant voltage circuit for applying a constant operating voltage to a DC motor in order to effect rapid starting of same, and, additionally, to the simultaneous cutting-off of the constant voltage circuit and shunting of the current across the DC motor in order to effect immediate stopping of the DC motor. Moreover, although illustrated in combination with a calculator including a printer in FIG. 7 of the instant application, this representation is made by way of example only, it being noted that the DC motor control circuit, of the instant invention, is particularly suitable for use with any apparatus controlled by a DC motor requiring that the DC motor be repeatedly started and stopped.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. In a DC motor control circuit comprising a DC motor adapted to be driven in response to an operating voltage applied thereto and braking means defining a current path coupled in parallel with said DC motor for selectively braking said DC motor in response to a control signal applied thereto, the improvement comprising DC supply means for producing a DC signal, constant voltage means coupled intermediate said DC supply means and the parallel connection of said braking means and DC motor for selectively applying a constant operating voltage to said DC motor, said constant voltage means being adapted, in response to a control signal applied thereto, to cut-off the application of a constant operating voltage to said DC motor, and control means coupled directly to said constant voltage means and directly to said braking means for coincidentally applying a control signal to said constant voltage means and to said braking means to coincidentally brake said DC motor and cut-off the application of said operating voltage to said DC motor.

2. A DC motor control circuit as claimed in claim 1, wherein said braking means includes a breaking control electrode coupled to said control means, and first and second current path electrodes coupled in parallel with said DC motor for shunting the voltage applied to said DC motor in response to a control signal being applied to said braking control electrode.

3. A DC motor control circuit as claimed in claim 1, wherein said constant voltage means include speed detecting means coupled in series with said DC motor, said speed detecting means including at least one reference terminal and being adapted to apply a suitable speed control current to said DC motor when said reference terminal is referenced to a first voltage level, said speed detecting means being further adapted to cut-off the flow of current to said DC motor in response to the reference terminal thereof being referenced to a second voltage level, and a fixed voltage element coupled to said speed detecting means reference terminal to reference same to a first voltage level, said reference means being further coupled to said control means in order to be selectively referenced to said second voltage level in response to a control signal being applied thereto.

4. A DC motor control circuit as claimed in claim 3, wherein said braking means includes a braking control electrode coupled to said control means said braking control electrode being adapted to be referenced from a first voltage level to a second voltage level in response to a control signal applied thereto, and first and second current path electrodes coupled in parallel with said DC motor for shunting the voltage applied to said DC motor in response to said braking control electrode signal being referenced from a first to a second voltage level.

5. A DC motor control circuit as claimed in claim 4, wherein said reference terminal of said constant voltage means is coupled to said braking control electrode, said control means being adapted to coincidentally reference said reference terminal and said braking electrode to a second voltage level and thereby shunt an operating voltage applied to said DC motor and cut-off the current applied to said DC motor by said speed detection means.

6. A DC motor control circuit as claimed in claim 5, wherein said fixed voltage element is a Zener diode coupled to a first terminal of said DC supply means, and said speed detection means is a Darlington connection means, said Darlington connection means including at least one drive control transistor having its base electrode coupled to said Zener diode to define said constant voltage means reference terminal.

7. A DC motor control circuit as claimed in claim 5, wherein said control means includes switching transistor means including a control electrode means adapted to receive a two-state START-STOP signal, and in response to the first state of said START-STOP signal reference said braking control electrode and reference terminal to a first voltage level, said control means being adapted in response to the second state of said START-STOP signal being adapted to apply said control signal to said control electrode of said braking means and said reference terminal of said constant voltage means and thereby reference same to a second voltage level.

8. A DC motor control circuit as claimed in claim 4, said control means including a first control transistor means coupled intermediate said shunt control electrode and a first terminal of said DC supply means, said first terminal being referenced to said second voltage level, and a second control transistor means coupled intermediate said reference terminal and said first terminal of said DC supply means, said first and second control transistor means each including a control electrode, and START and STOP circuit means coupled to said control electrode of said first and second control transistor means, said control transistor means being adapted in response to a STOP signal applied thereto to turn ON said first and second control transistor and thereby reference said reference terminal and said shunt control electrode to said first voltage supply terminal.

9. A DC motor control circuit as claimed in claim 8, wherein said START and STOP means include logic control means coupled to the control electrode of said first and second control transistor means for selectively switching said first and second control transistor means between an ON and OFF condition, in response to one of a START and STOP signal applied thereto.

10. A DC motor control circuit as claimed in claim 9, wherein said speed detection means is coupled in series with a second terminal of said DC supply means and is further coupled to said braking control electrode of said shunt transistor means.

11. A DC motor control circuit as claimed in claim 4, and including an information processing means including a printer, said DC motor being adapted to control the operation of said printer.

12. A DC motor control circuit as claimed in claim 11, wherein said information processing means is a calculator.

* * * * *